(12) United States Patent
Amine (10) Patent No.: US 10,834,433 B2
(45) Date of Patent: Nov. 10, 2020

(54) METHODS AND SYSTEMS FOR PROVIDING ON-DEMAND SERVICES THROUGH THE USE OF PORTABLE COMPUTING DEVICES

(71) Applicant: WorldRelay, Inc., Austin, TX (US)

(72) Inventor: Gilbert A. Amine, Austin, TX (US)

(73) Assignee: WORLDRELAY, INC., Austin, TX (US)

( * ) Notice: Subject to any disclaimer, the term of this patent is extended or adjusted under 35 U.S.C. 154(b) by 0 days.

(21) Appl. No.: 16/439,837

(22) Filed: Jun. 13, 2019

(65) Prior Publication Data

US 2019/0297355 A1 Sep. 26, 2019

Related U.S. Application Data

(63) Continuation of application No. 15/452,767, filed on Mar. 8, 2017, now Pat. No. 10,375,425.

(60) Provisional application No. 62/304,990, filed on Mar. 8, 2016.

(51) Int. Cl.
| | |
|---|---|
| *H04N 21/2187* | (2011.01) |
| *H04N 21/266* | (2011.01) |
| *H04N 21/2743* | (2011.01) |
| *H04N 21/24* | (2011.01) |
| *H04N 21/25* | (2011.01) |
| *G06Q 50/16* | (2012.01) |
| *G06Q 10/10* | (2012.01) |
| *H04N 21/4223* | (2011.01) |

(52) U.S. Cl.
CPC ....... *H04N 21/2187* (2013.01); *G06Q 10/105* (2013.01); *G06Q 50/16* (2013.01); *H04N 21/2408* (2013.01); *H04N 21/251* (2013.01); *H04N 21/26603* (2013.01); *H04N 21/2743* (2013.01); *H04N 21/4223* (2013.01)

(58) Field of Classification Search
CPC .. G06Q 10/105; G06Q 50/16; H04N 21/2408; H04N 21/4223; H04N 21/2187; H04N 21/251; H04N 21/2743; H04N 21/26603
USPC .................................................. 709/203, 219
See application file for complete search history.

(56) References Cited

U.S. PATENT DOCUMENTS

| | | | |
|---|---|---|---|
| 10,114,897 B1* | 10/2018 | Ledet ..................... | G06F 16/285 |
| 2012/0069131 A1* | 3/2012 | Abelow ............... | G06Q 10/067 |
| | | | 348/14.01 |
| 2012/0231814 A1* | 9/2012 | Calman .................. | G06Q 50/16 |
| | | | 455/456.3 |
| 2013/0073336 A1* | 3/2013 | Heath ..................... | G06Q 30/02 |
| | | | 705/7.29 |
| 2013/0202274 A1* | 8/2013 | Chan ....................... | H04N 7/185 |
| | | | 386/362 |
| 2014/0040368 A1* | 2/2014 | Janssens ................ | H04L 67/306 |
| | | | 709/204 |

\* cited by examiner

*Primary Examiner* — Frantz B Jean (74) *Attorney, Agent, or Firm* — Pierson IP, PLLC (57) ABSTRACT

Examples of the present disclosure relate to techniques providing on-demand services through the use of portable computing devices. More particularly, embodiments are related to methods and systems for allowing point-of-view streaming via mobile devices by matching users browsing a webpage with an associated real world address with a streamer with a mobile device.

24 Claims, 8 Drawing Sheets

LANDMARK A — 310

- Value $300,000
- $100 Finders Fee
- Probability of Sale Within a Week: 5%
- Average 4G/LTE Signal (0.5Mbps Upload Speed)

LANDMARK B — 320

- Value $200,000
- $50 Finders Fee
- Probability of Sale Within a Week: 2%
- Excellent Wi-Fi (2 Mbps Upload Speed)

LANDMARK C — 330

- Value $150,000
- $200 Finders Fee
- Probability of Sale Within a Week: 10%
- Strong 4G/LTE Signal (1 Mbps Upload Speed)

FIGURE 3A

USER A — 350

- Looking at Landmarks A and B
- ★★★★ (4 stars)
- Income Supports Purchase of A or B
- Looked at 5 Other Properties in Past Week
- "Good Prospect"

USER B

- Looking at Landmark B
- ★★ (2 stars)
- Income Supports Purchase of B, but Not C
- Looked at 50 Properties in Past 3 Months
- "Tire Kicker"

USER C

- Looked at Landmarks B and C (2 Hours Ago)
- ★★★★ (4 stars)
- Unknown Income Level
- Did Not Look at Anything Else
- "Unknown Prospect"

FIGURE 3B

STREAMER A — 410

- ABC Realty
- iPhone (AT&T)
- 3% Commission
- $10 Referral Payout

STREAMER B

- XYZ Realty
- iPhone (Verizon)
- 3% Commission
- $8 Referral Payout

STREAMER C

- XYZ Realty
- Camera – Wi-Fi Only
- 2.75% Commission
- $8 Referral Payout

FIGURE 4A

STREAMER A — 410

- 0.25 Miles / 3 Minute Drive
- Available Now (+ Drive Time)

STREAMER B

- 0.75 Miles / 5 Minute Drive
- Available Now (+ Drive Time)

STREAMER C

- 0.5 Miles / 3 Minute Drive
- Available in 5 Minutes (+ Drive Time)
- 0.5 Miles From Landmark A

48  Enchanted Ln,
Austin, TX 78745

3 beds · 2 baths · 1,368 sqft

Renovated by designer 3/2 home in South Austin. Mix of mid-century and modern finishes on a quiet, magical street. Two living areas & eat-in kitchen with mahogany cabinets & stainless steel appliances. Bathrooms have been upgraded but retain the mud-set tiles & steel tubs. Three large bedrooms with en-suite master. Five closets. Two storage areas. New paint, finished concrete floors, upgraded plumbing, electrical & professional-grade windows. The large lot boasts a huge oak tree. Easy access to downtown ● FOR SALE
$389,000
Zestimate®: $271,372

EST. MORTGAGE
$1,395/mo
See current rates

FACTS
- Lot: 8,537 sqft
- Single Family
- Built in 1959
- 12 days on Zillow
- Views since listing: 999
- All time views: 1,059
- 16 shoppers saved this home
- Cooling: Central
- Heating: Other
- Price/sqft: $284
- MLS #: 9561663

FEATURES
- Flooring: Concrete
- Parking: Carport, 1 space
- Storage

METHODS AND SYSTEMS FOR PROVIDING ON-DEMAND SERVICES THROUGH THE USE OF PORTABLE COMPUTING DEVICES

CROSS-REFERENCE TO RELATED APPLICATIONS

This application claims a benefit of priority under 35 U.S.C. § 119 to Provisional Application No. 62/304,990 filed on Mar. 8, 2016, which are fully incorporated herein by reference in their entirety.

BACKGROUND INFORMATION

Field of the Disclosure

Examples of the present disclosure relate to techniques providing on-demand services through the use of portable computing devices. More particularly, embodiments are related to methods and systems for allowing point-of-view streaming services via mobile devices by matching users browsing a webpage or using application programs with an associated a real world address with a streamer with a mobile device.

Background

Point-of-view (POV) is a mode of video recording audio, pictures, and video as seen by a person with a camera, as if the viewer is physically located at the location associated with the camera. Live POV steaming is the broadcasting of a POV video feed over the internet and other communication channels in real time. With the advent of smart phones and other mobile devices, live POV streaming is growing in popularity. Live POV streaming can be advantageous to many business applications that can provide a more personal and interactive experience than conventional recorded tours. Utilizing live POV streaming, a viewer can interact with a streamer to view a location without having to physically be located at the recording location.

However, conventional live POV streaming services only offer a limited amount of POV streamers. Further, conventional POV services only allow a live video feed recorded from the POV streamer without the user being able to remotely control or request a location that the POV streamer records.

Accordingly, needs exists for more efficient and effective systems and methods for providing on-demand services through the use of portable computing devices.

SUMMARY

Examples of the present disclosure relate to techniques providing on-demand services through the use of portable computing devices. More particularly, embodiments are related to methods and systems allowing point-of-view streaming via mobile devices by matching users browsing a webpage or using a application program with an associated real world address with a streamer with a mobile device.

Embodiments describe a network of computer servers and computing devices with cameras, wherein the network is configured to communicate live POV streaming services of landmarks, events, and locations to viewers on separate computing devices. Embodiments may be configured to match mobile streamers with viewers via an on-demand service, wherein the mobile streamers in under serviced areas may be notified of requests for additional streamers.

Embodiments may be configured to enable a user utilizing a graphical user interface on a first computing device to connect with a streamer utilizing a second computing device. Responsive to forming a link from the first computing device with the second computing device, the graphical user interface of the first computing device may present streamed multimedia captured from the second computing device.

In embodiments, a user associated with the first client computing device may be offered live POV streaming from more than one second computing devices that are in close geographic proximity to one or more landmarks, which might be of potential interest to the user associated with the first client computing device. Embodiments may be configured to match users associated with first client computing devices with streamers associated with second client computing devices by weighing attributes that are associated with the user of the first client computing device, attributes that are associated with the streamer, and/or attributes that are associated with the landmark, event, etc. The attributes may be static (such as the location of the landmark), while other attributes may be dynamic that change in real-time, such as the geo-location of the streamers, user behavior, marketplace activity, etc. Based on these dynamic and static attributes that on-demand services requested may rapidly change.

In embodiments, a streaming server may be configured to receive requests for streaming services, locations of one or more landmarks, and the geo-location and other attributes of streamers. In embodiments, a matching algorithm may take into account competing requests for live POV streaming from multiple users and/or multiple landmarks, and select users that have the best match for the available streaming resources.

One embodiment may be utilized for live POV streaming of real estate landmarks, such as home for sale, rentals, office space, etc. Embodiments may allow a user of a first client computing device to receive a live POV tour of a property, remotely from the first computing device.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Figure 1:
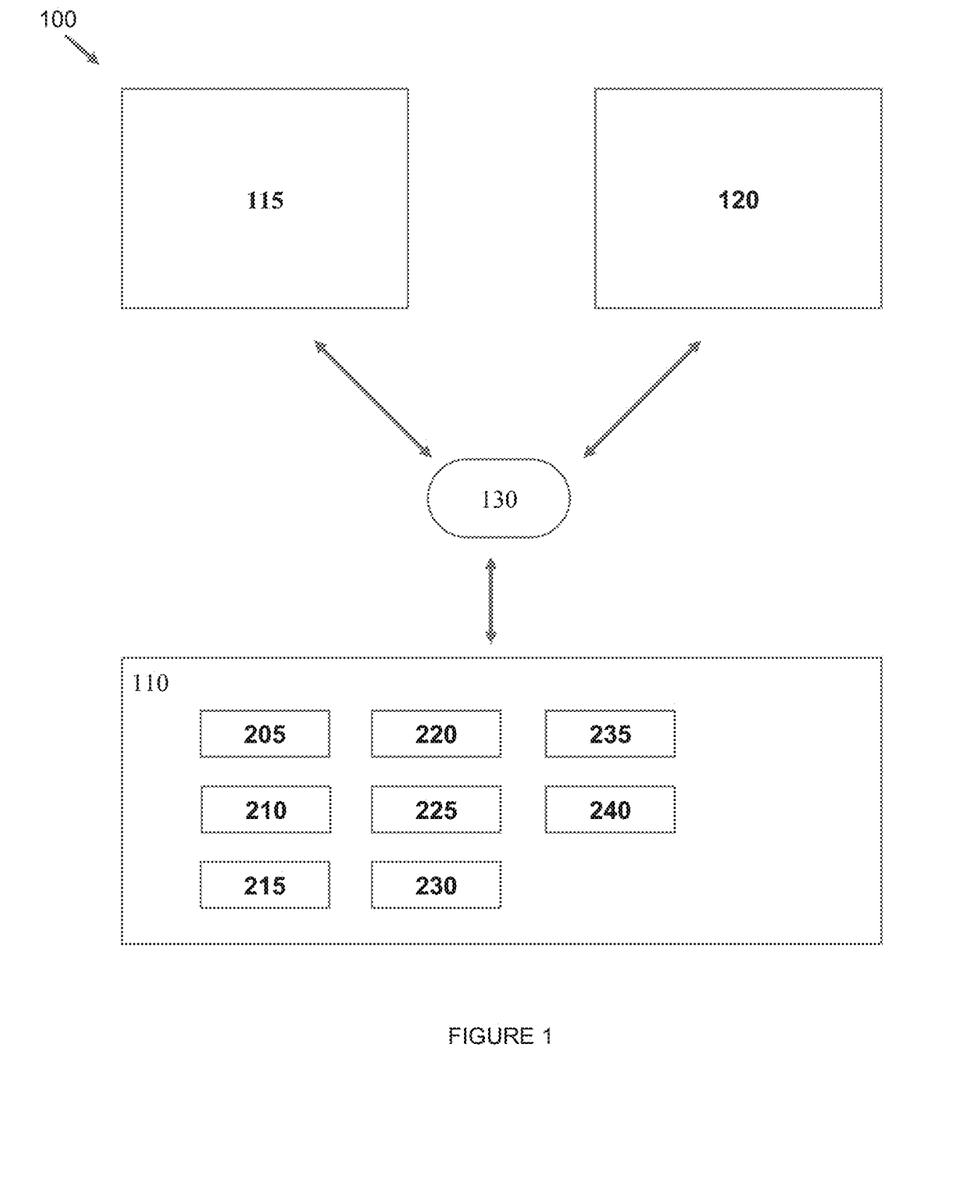
FIG. 1 depicts one topology a system configured to provide on-demand POV streaming servers to users based on a plurality of attributes, according to an embodiment.

Turning now to FIG. 1, FIG. 1 depicts one topology 100 a system configured to provide on-demand POV streaming servers to users based on a plurality of attributes, according to an embodiment. Topology 100 may include a logic server 110, network 130, streamer computing device 115, viewer computing device 120, and website interface 125. The elements depicted in topology 100 may be communicatively coupled to each other over network 130.

Network 130 may be a wired or wireless network such as the Internet, an intranet, a LAN, a WAN, a NFC network, Bluetooth, infrared, radio frequency, a cellular network or another type of network. It will be understood that network 130 may be a combination of multiple different kinds of wired or wireless networks.

Logic server 110 may be a computing device, such as a general hardware platform server configured to support mobile applications, software, and the like executed on streaming computing device 115 and viewer computing device 120.

Logic server 110 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Logic server 110 may include any combination of one or more computer-usable or computer-readable media. For example, Logic server 110 may include a computer-readable medium including one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device.

Logic server 110 may be configured to receive multimedia received from streamer computing devices 115, and transmit/broadcast the multimedia to viewer computing devices 120. Logic server 110 may also be configured to determine the location of streamer computing devices 115 at a given time. Logic server 110 may also be configured to receive HTTP requests from one or more online interfaces 125 that viewer computing device 120 is interacting with, and determine a location associated with the online interface 125. Logic server 110 may be configured to determine if the location of streamer computing devices 115 is within a close proximity with the location associated with the online interface 124. Responsive to determining that the locations are within close proximity, logic server 110 may transmit information to be presented in the online interface 125, wherein the user of viewer computing device 120 may select a POV streaming service associated with streaming computing device 115.

Logic server 110 may include a processing device 215, a communication device 210, a memory device 215, a viewer profile module 220, a streamer profile module 225, a geolocation module 230, a matching module 235, and a session module 240.

Processing device 205 may include memory, e.g., read only memory (ROM) and random access memory (RAM), storing processor-executable instructions and one or more processors that execute the processor-executable instructions. In embodiments where processing device 205 includes two or more processors, the processors may operate in a parallel or distributed manner. Processing device 205 may execute an operating system of logic server 110 or software associated with other elements of logic server 110.

Communication device 210 may be a hardware processing device that allows logic server 110 to communicate with another device over a wireless or wired network, such as network 130. Communication device 210 may include one or more wireless transceivers for performing wireless communication and/or one or more communication ports for performing wired communication. Communication device 210 may be configured to communicate data over a plurality of different standard and/or protocols.

Memory device 215 may be a hardware memory device that stores data generated or received by logic server 110. Memory device 215 may include, but is not limited to a hard disc drive, an optical disc drive, and/or a flash memory drive. In embodiments, memory device 215 may be configured to store information received from client computing device 120, and retailer computing device 140. The information stored within memory device 215 may be accessed by processing device 205, communication device 210, and/ or modules 220, 225, 230, 235, 240.

Viewer profile module 220 may be a hardware processing device configured to create a profile for a viewer associated with viewer computing device 120. The viewer's profile may include data associated with user information, data connection information, trust score information, etc. The user information may include for example, information identifying users (e.g., a username or handle, a number, an identifier, and/or other identifying information), security login information (e.g., a login code or password), payment information (e.g., credit card information), loyalty rewards cards, demographic information associated with users, or any other information associated with the user. The data connection information may be associated with what type of connection is enabled with viewer computing device 120. For example, the data connection information may indicate whether the viewer can receive data cell data, Wi-Fi data, Ethernet data, and/or other types of connections. This may be utilized to determine the quality of received multi-media, and also to reduce bandwidth and/or costs associated with receive multimedia. The trust score information may be associated with a matching algorithm that determines a score associated with a viewer and a landmark and/or streamer.

Streamer profile module 225 may be a hardware processing device configured to create a profile for a streamer associated with streamer computing device 115. The streamer's profile may include data associated with a streamer's login, security login information, payment information (such as a bank account), data connection information, type of streamer computing device 115, score based on past reviews from users, location, past recorded multimedia, rates, schedule, history, data connection information, etc.

Geo-location module 230 may be a hardware processing device configured to determine the location of a streamer computing device 115 and/or a location associated with online interface 125. A location may be represented in geographic coordinates, Cartesian coordinates, e.g., an (x, y) point on a map if the map is divided into a Cartesian plane, and/or may be represented using reference points. In embodiments, geo-location module 230 may determine the location of online interface 125 based on an associate for online interface 125 performing actions to enter location information for online interface 125. For example, an associate of online interface 125 may enter a physical address associated with an address. In a specific example, a real estate agent may enter data associated with the real world address of a real world property. The location data associated with the real world property may be linked with a website displayed on viewer computing device 120. The location information may be subsequently transmitted to logic server 110. Responsive to receiving the location information associated with online interface 125, location geo-location module 230 may store the location information within a corresponding entry for the website for the property within a database within memory device 215.

Geo-location module 230 may also be configured to determine a map of a geographic area, and determine the location of streamer computing device 115 and a location associated with online interface 125. The geographic area may include a plurality of segments of roads, retailers, vehicles, etc. The geographic area may be segmented into a plurality of distinct geographic regions, such as zip codes, user defined regions, user defined geographic regions, addresses, etc. The map may include landmarks, such as museums, stadiums, real estate locations, or other points of interests, wherein each landmark may have its own distinct location that is stored within memory device 215.

Geo-location module 230 may determine the location of streamer computing device 115 responsive to receiving location information from streamer computing device 115 or responsive to transmitting requests for location information to streamer computing device 115. In embodiments, geo-location module 230 may be configured to receive the location information of streamer computing device 115 set intervals, which may be any desired period of time (e.g., every $1/10^{th}$ of a second, every second, every minute, every ten minutes, etc.), based on the streamer's settings within the streamer's profile, responsive to the streamer performing actions on streamer computing device 115, or responsive to determining that an initiator action associated a user viewing online interface 125 that is in close proximity to the streamers last location. Geo-location module 230 may determine the location of streamer computing device 115 via any known means, such as one or a combination of: global navigation satellite system (GNSS), Wi-Fi RTLS, mobile device tracking, time distance of arrival (TDOA) signals, Received signal strength (RSS), trilateration, triangulation, etc. Responsive to determining the location of streamer computing device 115, geo-location module 230 may store, within a corresponding entry of database within memory device 215. The location information may include a time stamp identifying the time that the location of the streamer is determined.

Matching module 235 may be a hardware computing device configured to match viewer computing devices 120 with streamer computing devices 115 via on-demand services. Matching module 235 may be configured to match viewers and streamers by receiving requests for live POV sessions from viewer computing devices 120, based on an algorithm weight the user information, landmark information, streamer information, and other information to assign a score for each streaming service requested, process the scores associated with the requests, and provide a match between viewer computing device 120 and streamer computing device 115. Matching module 235 may communicate with devices using a plurality of different protocols, such as JavaScript Object Notation (JSON).

Session module 240 may be a hardware computing device configured to manage the connections of streaming video from streamer computing devices 115 and viewer computing devices 120. For example session management system 240 may be configured to video streaming session setup, monitoring, and tear down, audio communication session setup, etc. For example, session module 240 may operate via Session Initiation Protocol (SIP) servers and WebRTC media routers. Furthermore, session module 240 may be configured to process payment transitions from viewer computing device 120 to streamer computing device 115, and/or third parties. The transactions may include money credits and debits from bank accounts, credit card, online payment services, etc.

Viewer computing device 120 may be a desktop computer, smart phone, tablet computer, laptop computer, personal data assistant, or any other type of device with a hardware processor that is configured to process instructions and connect to one or more portions of network 130. Viewer computing device 120 may be configured launch software, applications, a browser, etc. to access online interface 125. Responsive to viewing online interface 125, viewer computing device 120 may be provided with streamers in close proximity to a desired location, which may be based on an address associated with a specific webpage on online interface 125.

Streamer computing device 115 may be a smart phone, tablet computer, laptop computer, personal data assistant, or any other type of mobile device with a hardware processor that is configured to process instructions and connect to one or more portions of network 130. Streamer computing device 115 may include a camera configured to record images, video, 360-degree video, etc., a microphone configured to receive sound data, a speaker configured to output sound, etc. Streamer computing device 115 may be configured to transmit multimedia to viewer computing device 120 directly or through logic server 110. In embodiments, streamer computing device 115 may be configured to transmit multimedia directly to viewing computing device 120 over network 130 if only a single viewer is viewing multimedia captured by streamer computing device 115. However, to save bandwidth if multiple viewers (or a single viewer) desire to receive captured POV streaming video from streamer computing device 115, streamer computing device 115 may transmit the video to logic server 110, which may transmit the streaming media to a plurality of viewer computing devices 120.

Online interface 125 may be a website, application, software, or any collection of related webpages or modules, including multimedia content. Online interface 125 may include a common domain name, application name, etc. and may be accessed by a viewer computing device 120 over network 130. In embodiments, each page of an online interface 125 may include an associated physical location, which may be embedded within the building blocks of the webpage or application program. For example, an online interface 125 associated with a realtor may have a plurality of unique webpages, wherein each webpage may include a different property listing. Based on the real world physical location of the property, the webpage or application program may have an associated embedded location.

In an embodiment, a viewer computing device 120 may determine that a viewer is a candidate to view a live POV stream from a streamer associated with a streamer computing device 115 based on viewer computing device 120 accessing a webpage with a location in close proximity to a streamer. This initial determination may be made based on the viewer's current and/or past actions on online interface 125, or an algorithm, such as an advertising server. In other embodiments, the viewer may initiate this request by interacting with an icon. Once the initial determination is made, a program transmits a query from viewing computing device 110 to logic server, which may indicate which landmark(s) the viewer is a candidate for viewing a POV stream form. The logic server 110 may query the memory device to determine what streamers are in close proximity with addresses associated with the landmark(s). Logic server 110 may then determine scores for the streamers and the users in relation to the landmark(s).

Figure 2:
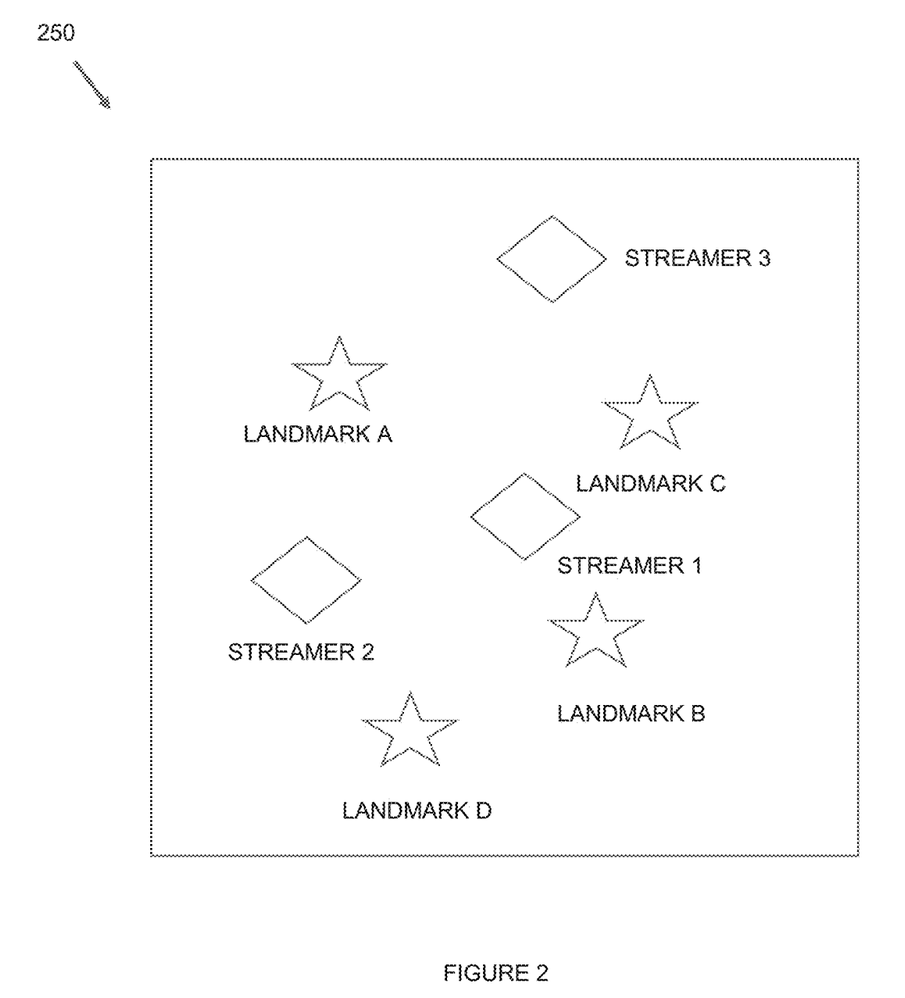
FIG. 2 depicts an embodiment of a dynamic map determined by logic server that includes landmarks and locations of streamer computing devices according to an embodiment.

FIG. 2 depicts an embodiment of a dynamic map 250 determined by logic server 110 that includes landmarks and locations of streamer computing devices 115, according to an embodiment. As depicted in FIG. 2, map 250 may include a plurality of landmarks and a plurality of streamers, wherein the streamers may be different distances from the landmarks. In embodiments, only streamers that are within a given threshold distance from noted landmarks, or who posses certain attributes may be presented on map 250.

Furthermore, each landmark depicted on map 250 may be associated with an address for the individual pages on online interface 125.

Figure 3A:
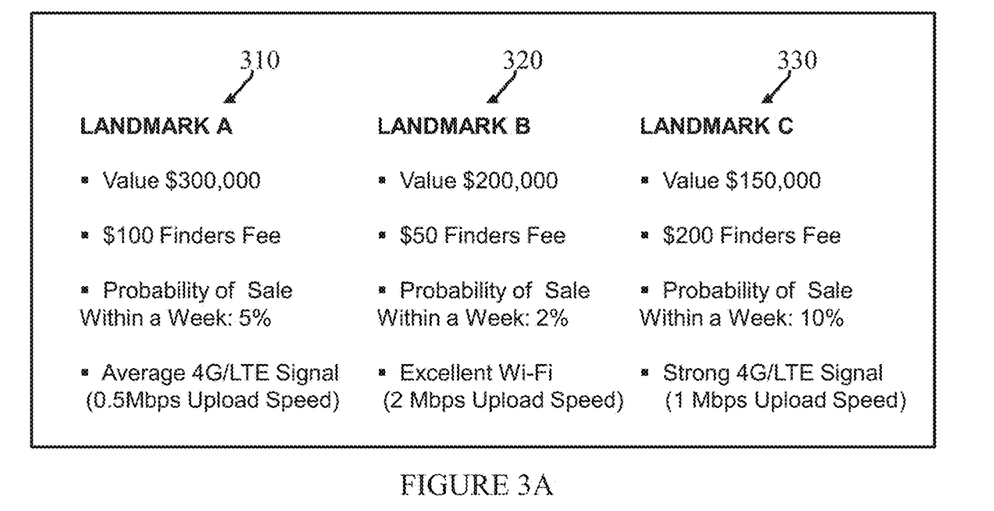
FIG. 3A depicts attributes associated with landmarks for an online interface, according to an embodiment.

FIG. 3A depicts attributes associated with landmarks for online interface 125, according to an embodiment. As depicted in FIG. 3A, multiple landmarks 310, 320, 330 may each have associated attributes. These attributes may be utilized to determine a value score for every landmark. The attributes may be a subset of landmark-related information that is managed by logic server 110. For example, landmarks 310, 320, 330 may be associated with real estate listings, and may include a selling price, a finder's fee for a live POV service provider, a predicted probability of sale in the next week, data connectivity options (cellular, Wi-Fi, Ethernet, etc.) that are directly associated with the landmark, etc. The attributes associated with the landmarks may be pulled from another service, such as a Multi-Location Service (MLS), while other attributes (such as the finder's fee) may be a fixed or variable value that may be queried from an online system. The probability of sale may be calculated by logic server 110 from data derived from the MLS, such as the length of time that properties in the same zip code have sold. The data connectivity information may be based on information that is associated with the property or estimated based on known wireless data coverage maps. For example, a selling agent may note in MLS that a landmark has Wi-Fi available for POV streaming.

In embodiments, logic server 110 may assign a score to each landmark based on one or more of the landmark's attributes. For example, properties with higher values, higher finder's fees, higher probability of sale, and strong Wi-Fi coverage may have a higher score than properties with lower corresponding values, wherein each of these attributes may have the same of different weights. For example, a landmark may be given a score of 0-100, wherein the property value may be given a score of 0 to 50, the finder's fee may have a score of 0 to 30, the probability of sale in a week may have a value of 0 to 10, and data connectivity may have a score of 0 to 10. Other attributes and weighting levels may vary for different applications. Certain landmarks may have a score of 0, wherein there is no wireless data connectivity.

Figure 3B:
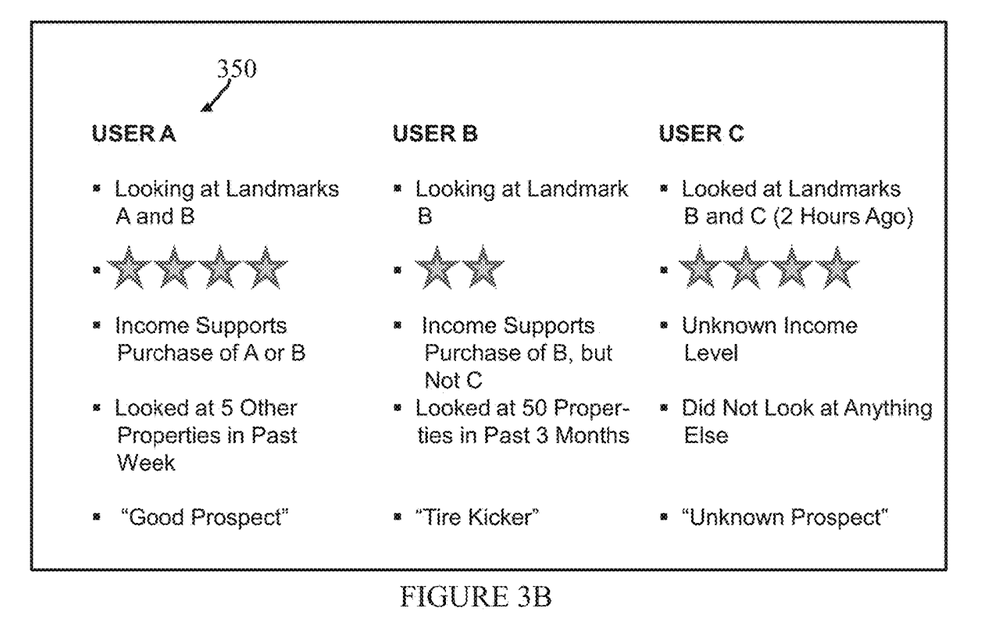
FIG. 3B depicts an embodiment of attributes associated with a user determine a value score for each viewer viewing landmarks on online interface.

FIG. 3B depicts an embodiment of attributes 350 associated with a user determine a value score for each viewer viewing landmarks on online interface 125. These attributes may be a subset of the user-related information that is management by logic server 110. In this example, users are shown along with selected attributes, such as real-time or historic browsing history in relation to landmarks, reviews provided from streamers, income level, and predicted behavior based on previous activities. There may be many attributes not shown. Logic server 110 may assign a score to each user based on one or more of the attributes, which may be weighted differently. For example, user income level may be given a weighted score of 0 to 50, previous review levels may have a score of 0 to 10, browsing activity associated with a landmark may have a score of 20, etc. Other attributes may have weight levels that automatically assign a 0 to the user score. For example, a user that has recently filed for bankruptcy may automatically be given a score of 0.

Figure 4A:
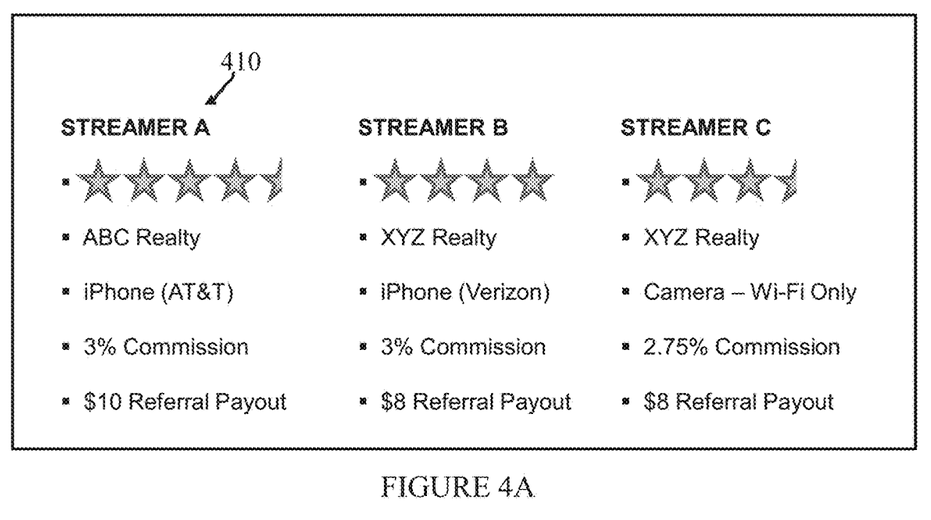
FIGS. 4A and 4B depict embodiments of attributes associated with streamers wherein a score is determine for the streamers based in part on attributes for a landmark.
Figure 4B:
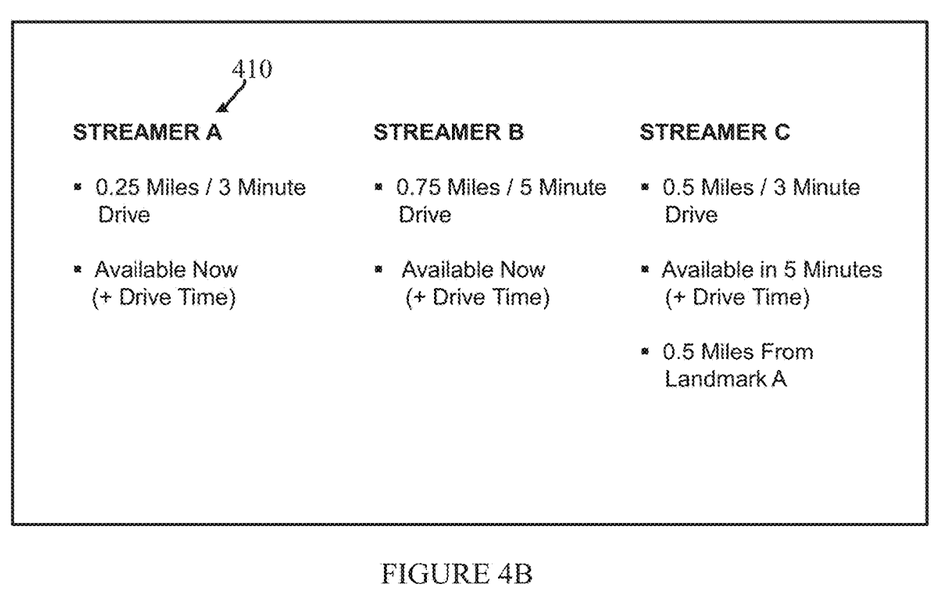

FIGS. 4A and 4B depict embodiments of attributes associated with streamers 410, wherein a score is determine for the streamers based in part on attributes for a landmark. The attributes may be a subset of the streamer related information that is managed by logic server. In this example, streamers may be listed along with select attributes, such as review levels, realty name, streamliner computing device, commission level, referral payout to live provided by viewers that previously watched live POV streams from that streamer etc.

A program within logic server 110 may assign a score to each streamer based on one or more attributes. For example, streamers may have higher scores based on their review levels, better known reality companies, better data connectivity, lower commission level, etc. Furthermore, a portion of a streamer's score can dynamically change based on his proximity to a landmark. For example, a streamer that is closer in proximity to a landmark may be given a higher weighted attribute score than a streamer that is further away from the landmark. As such, an on-demand service based on the streamers proximity to a landmark can be created, wherein streamers may receive higher scores if they are in close proximity to a static landmark.

This may enable viewers that are in fixed locations associated with viewer computing devices 120 to remotely control the locations of streamers associated with streamer computing devices 115. For example, if a plurality of different viewer computing devices 120 desire to share a POV video from a single streamer computing device 115 at a specific location, streamers may have a high incentive to move to a given location. As such, multiple users or a single user at a remote and static location, may on-demand change the locations (or incentive to be in different locations) of different streamers.

The scoring system may assign one or more weighted variables to determine a streamer's score in relation to a specific landmark. In one embodiment, the streamer's score for a landmark may be based on a review level, reputation, equipment, commission, location, etc. Furthermore, the streamers score may dynamically change for each different landmark based on the changing of the positioning of a streamer.

Figure 5:
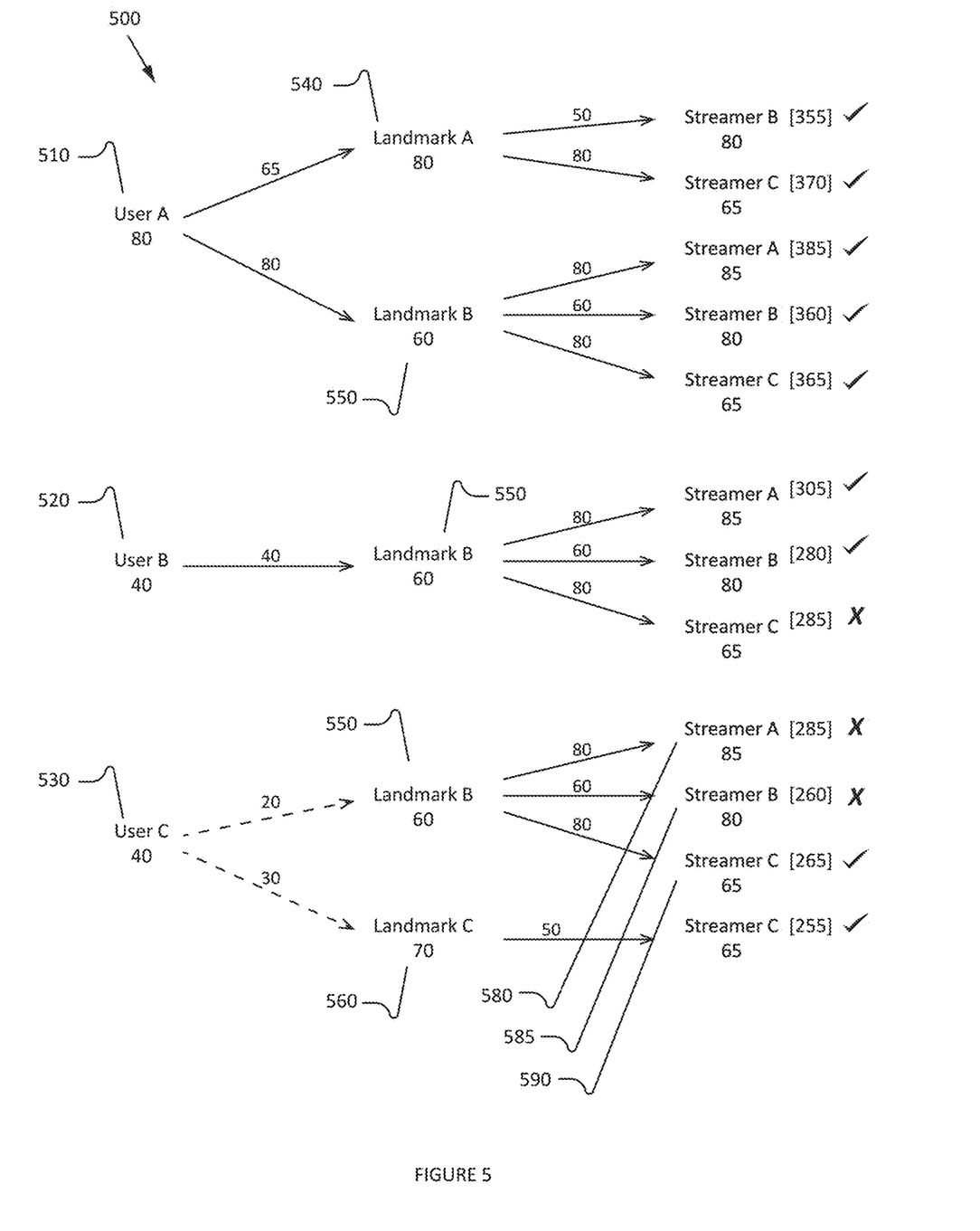
FIG. 5 depicts one embodiment utilized by a matching module to link streamers with viewers.

FIG. 5 depicts one embodiment utilized by matching module 235 to link streamers with viewers. Matching module 235 may link streamers with viewers to provide a best pairing of users with streamers in relation to landmarks, and to allow streamers to move to be in the best position for on-demand services. These algorithms may be application dependent and may differ in objective functions, constrains, and available choices. For example, an objective function in some applications may be to offer the maximum number of potential live POV stream options to a user, while others emphasize the financial return to a service provider. In one embodiment, a score is calculated for each user based on fixed attributes, a score is calculated for each streamer based on fixed attributes and variable attributes, wherein the attributes for both the streamer and viewer may be weighted.

As depicted in FIG. 5, a tree 500 for four different viewers 510, 520, 530, 540 may be created to determine scores for corresponding landmarks 540, 550, 560, wherein different viewers may desire to view the same and/or different landmarks. Each of the viewers may be given a corresponding score for each landmark. Furthermore, a plurality of streamers 580, 585, 590 may be given a score correlating to each landmark 540, 550, 540, 560, wherein each of the streamers score correlating to a landmark may be the same score for each of the viewers. In further implementations, scores of streamers may be linked to users instead of landmarks.

The overall scores for each possible user-landmark-streamer branch are determined and shown in FIG. 5. The overall scores are then compared and a decision is made by logic server as to which POV streaming sessions are to be offered to which users. The logic behind these selections may vary between applications. These selections may vary in real-time, and may be driven by user behavior, new requests, and changes in the available locations of streamers. Furthermore, if a given location is having a higher amount of requests this information may be transmitted to streamers, wherein streamers may have higher scores if they are in closer proximity to a location. This may be advantageous when an event is occurring at a location. For example, during a sporting event, concert, etc. more viewers may request POV streaming at a specific location. This may alter the locations of a plurality of streamers to have a higher score.

Figure 6:
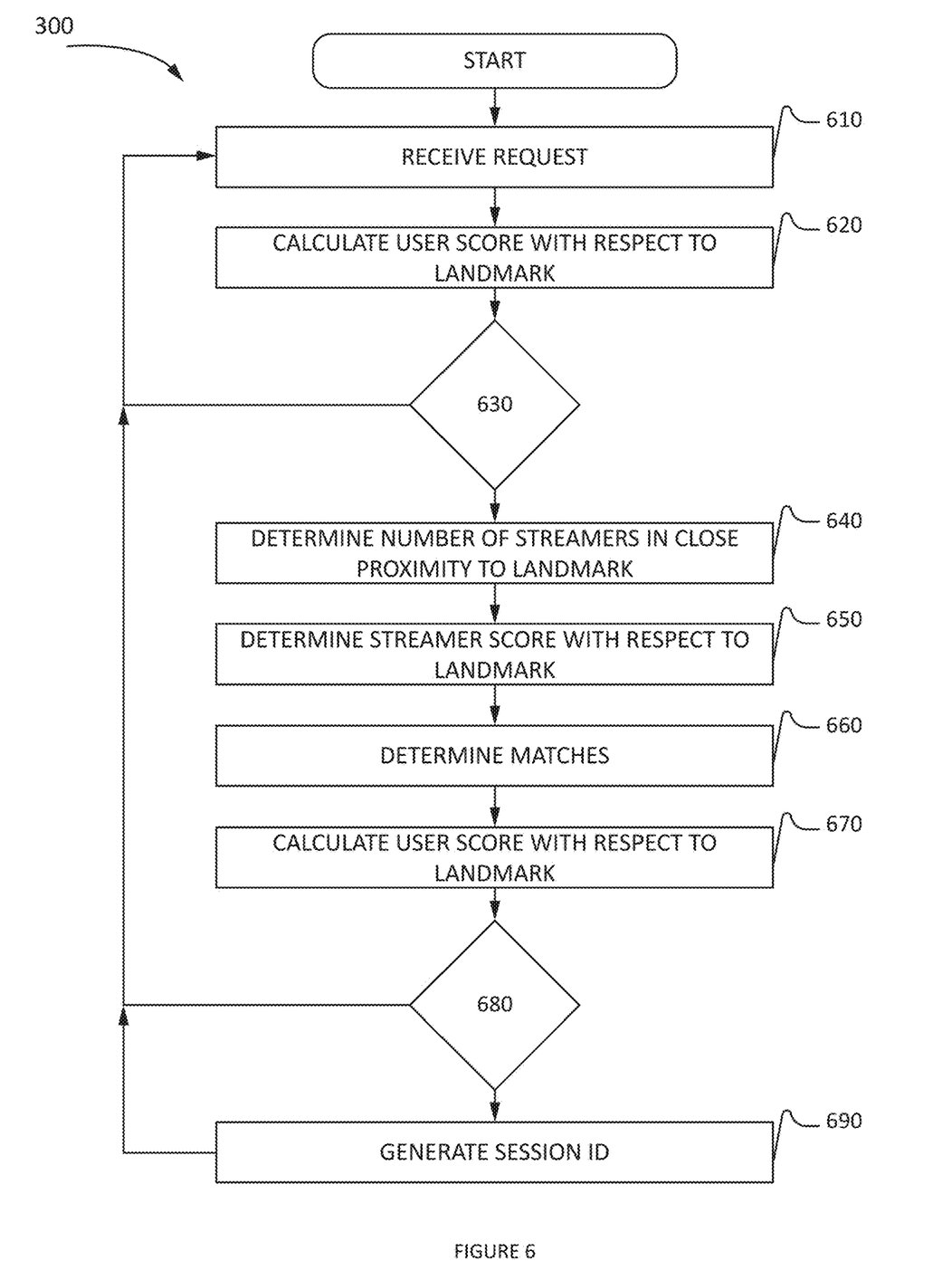
FIG. 6 illustrates a method for pairing viewers with streamers.

FIG. 6 illustrates a method 600 for pairing viewers with streamers. The operations of method 600 presented below are intended to be illustrative. In some embodiments, method 600 may be accomplished with one or more additional operations not described, and/or without one or more of the operations discussed. Additionally, the order in which the operations of method 300 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At operation 610, a logic server may receive a request from a viewer computing device. The request may be to receive a POV streaming service of a landmark from a streamer at a remote location, wherein the remote location may be in close proximity to the landmark. The request may be initiated based on a viewer interacting with an online interface or an online map to request a service.

At operation 620, responsive to receiving the request, the logic server may calculate a score of a user with respect to a landmark. The logic server may fetch information about the viewer/user and/or the landmark (and other online systems, such as MLS), and calculate a score matching the user with the landmark.

At operation 630, it may be determined if the score associated with the user and the landmark is below a threshold. The threshold may be a static number or may vary based on landmarks, which may vary based on a schedule. For example, a first landmark may have a first threshold, and a second landmark may have a second threshold, wherein the first and second thresholds are different. If the user's score associated with the landmark is below the thresholds, the user's request may be denied.

At operation 640, if the user's score is above a threshold, the logic server may determine a number of available streamers that are within a geographic proximity to the landmark within the request. Streamers that are outside a given threshold distance from a pre-set limit may be excluded from further consideration. In embodiments, different landmarks may have the same distance threshold and/or different distance thresholds.

At operation 650, a score for each of the available streamers within the given threshold to the landmark may be determined.

At operation 660, a score for each user-landmark-streamer branch may be determined.

At operation 670, the logic server may match the highest score on each branch to match a streamer with at user or a plurality of users for a given landmark stream. In embodiments where there is a high comparative score, the logic server may accept the request and automatically link the user to the streamer, and take branches with associated resources (streamer) out of the available pool in order to avoid double-booking streamers.

At operation 680, a user may receive a request to accept, defer, or decline the live POV request for the determined streamer.

At operation 690, if the request is accepted, a session ID is generated by the logic server, and is used to index the branch information associated with the user, landmark, and streamer. The session ID and information may be stored within the memory device. Furthermore, the streamer resource may be temporarily taken out of considerations for other POV streaming. Responsive to the session ending, the streamer may be available for further POV streaming services.

In embodiments, it may be anticipated that not all offered live POV streaming sessions will be accepted. Temporary matches users, landmarks, and streamers may become unavailable due to a variety of reasons. Furthermore, users, streamers, or landmarks may become available as sessions end or as new users join the systems or streamers get in close proximity to the landmarks under consideration. In some embodiments, before offering live POV streaming options, the logic server may confirm that a streamer is interested and available to provide the live POV streaming session. Furthermore, the logic server may transmit data to streamers concerning a higher level of requests associated with a specific landmark, along with the location data of the landmark. In such cases, the logic server may generate an electronic message to a streamer providing details of proposed streaming session, and request that the streamer accepts the session. The streamer may interact with the user/viewer by voice, text, or other communications means before agreeing to perform the streaming. One example, may be a real estate agent (streamer) may wish to pre-qualify a potential buyer (viewer) before driving to the property (landmark) that he or she is interest in. In some instances, the streamer and the viewer may schedule the streaming session be performed at a later time.

In some embodiments, if a user-landmark-streamer branch score is close to a threshold (i.e. it is not high enough for the live stream to be accepted or low enough for it to be tuned down, the aforesaid request may be deferred for a period of time). In this example, the logic server may keep the branch or branches that fall in the borderline range in the consideration pool in case other branches are not acted upon, and more streamers become available.

Figure 7:
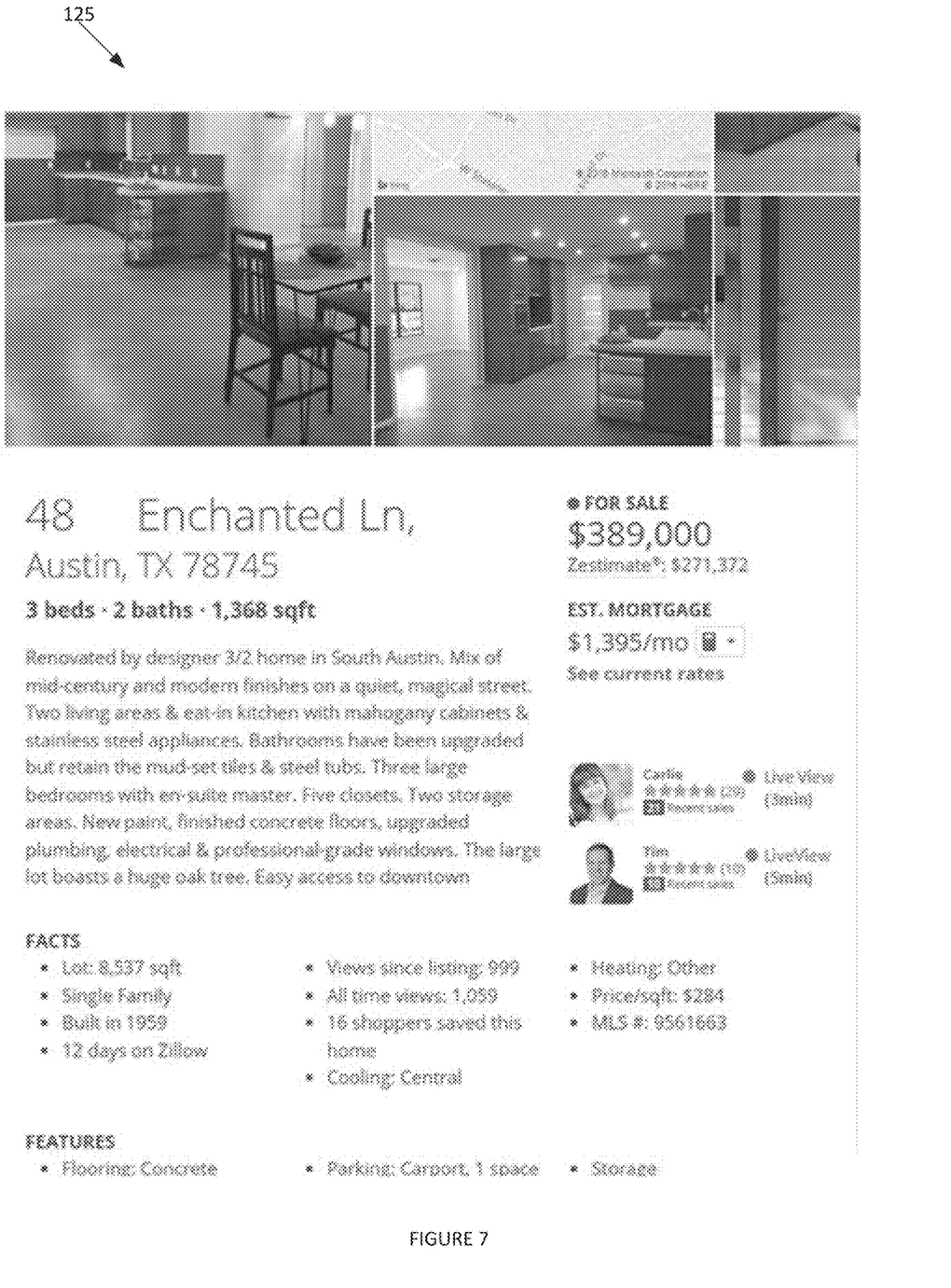
FIG. 7 depicts an embodiment of an online interface.

FIG. 7 depicts an embodiment of an online interface 125. As depicted in FIG. 7 online interface 125 may be a page associated with a real estate listing as seen through a web browser, mobile application, etc. A typical view of the listing may show information about contacting the listing agent or one or more pre-selected buyers, wherein the listing agents may also be streamers. In an embodiment, a program residing on viewer computing device 120 or on online interface 125 may track the viewer's behavior on the webpage, such as the length of time the viewer spends on the webpage, actions performed on the webpage, etc. Responsive to the viewer visiting the webpage, the geolocation associated with the webpage may be pulled by the logic server. The geolocation associated with the specific webpage may be preset by an agent actively entering the geolocation information associated with the website and/or website. Alternatively, the geolocation information may be based on the subject matter of the webpage, an address associated with the website, etc. For example, a blog associated with a local basketball team may have at least one geolocation associated with venues where basketball teams play. Therefore, pages within a website (or application program) may each have their own associated geolocation. Responsive to transitioning from a first webpage to a second webpage, the geolocation associated with the webpage may change.

In embodiments, once a user activity threshold has been met for a webpage, a program on the viewer computing device may generate a live POV live stream request to the logic server. The logic server may assign a score to potential branches associated with the request. In embodiments, the activity threshold may be determined after a time threshold on a webpage has been met. Therefore, if the activity threshold is not met, the live POV stream request may not be generated.

In the example shown in FIG. 7, the logic server mat determine to present the user with the option of viewing the landmark by two streamers who are within a closer physical proximity to the landmark. The streamer information to be presented to the user may replace a blank portion on the webpage or some default information (such as the information associated with the seller's realtor). To this end, the streaming POV video captures at the location associated with the webpage may be directly shown on the webpage with the same location information. In this example, the browser screen may get updated by the web server to display information associated with the two streamers, who may be qualified realtors who have the ability to represent a buy and have access to the property on the landmark. The streamer information may include the streamers name, picture, background information, and star rating. The streamer's availability may be displayed using a graphical element, such as a circle along with the proximity of the streamer to the landmark. If a streamer is no longer available or no longer in close proximity to the landmark, the streamer information may be removed from the corresponding webpage. To this end, streamers (i.e. realtors) may be able to view a webpage, determine if there are any other streamers in close proximity to a landmark, and if not, move in close proximity to the landmark. This may enable realtors to move to various locations to show different properties to perspective buys via an on-demand service, wherein the streamers do not have to have direct contact with the viewers to determine if there is a high need for streamers in a given location.

In embodiments with multiple streamer information being depicts on a webpage, if a user clicks on the information associated with a streamer, a request for initiation a communication session may be transmitted from the viewer computing device to the logic server. The logic server may create a corresponding session ID, provides information to a user application on viewer computing device to initialize, register, and configured WebRTC API parameters on the viewer computing device and the streamer computing device. An application on the viewer computer device, such as GetUsermedia component, may be set to grant access to the microphone (but not the camera), while an application on the streamer computer device may allow access to both the microphone and the camera. A RTCPeerConnection function may set up voice and video communication between the viewer computing device and the streamer computing device, additionally an RTCDataChannel application may set up data communication between the computing devices. In some embodiments, the user may select the option of having the POV streaming session recorded by the streamer computing device, uploaded to the logic server, white it may be stored and made available for on-demand access. This option may be useful in cases where data connection speeds do not support higher quality live video streaming, or if the subscriber desires to view the stream at a later time.

It should be noted that the example user interface presented in FIG. 7 may depend based on the type of viewer computing device and application program. The presentation of a live POV streaming session option may also vary between different applications and/or online interfaces 125.

Figure 8:
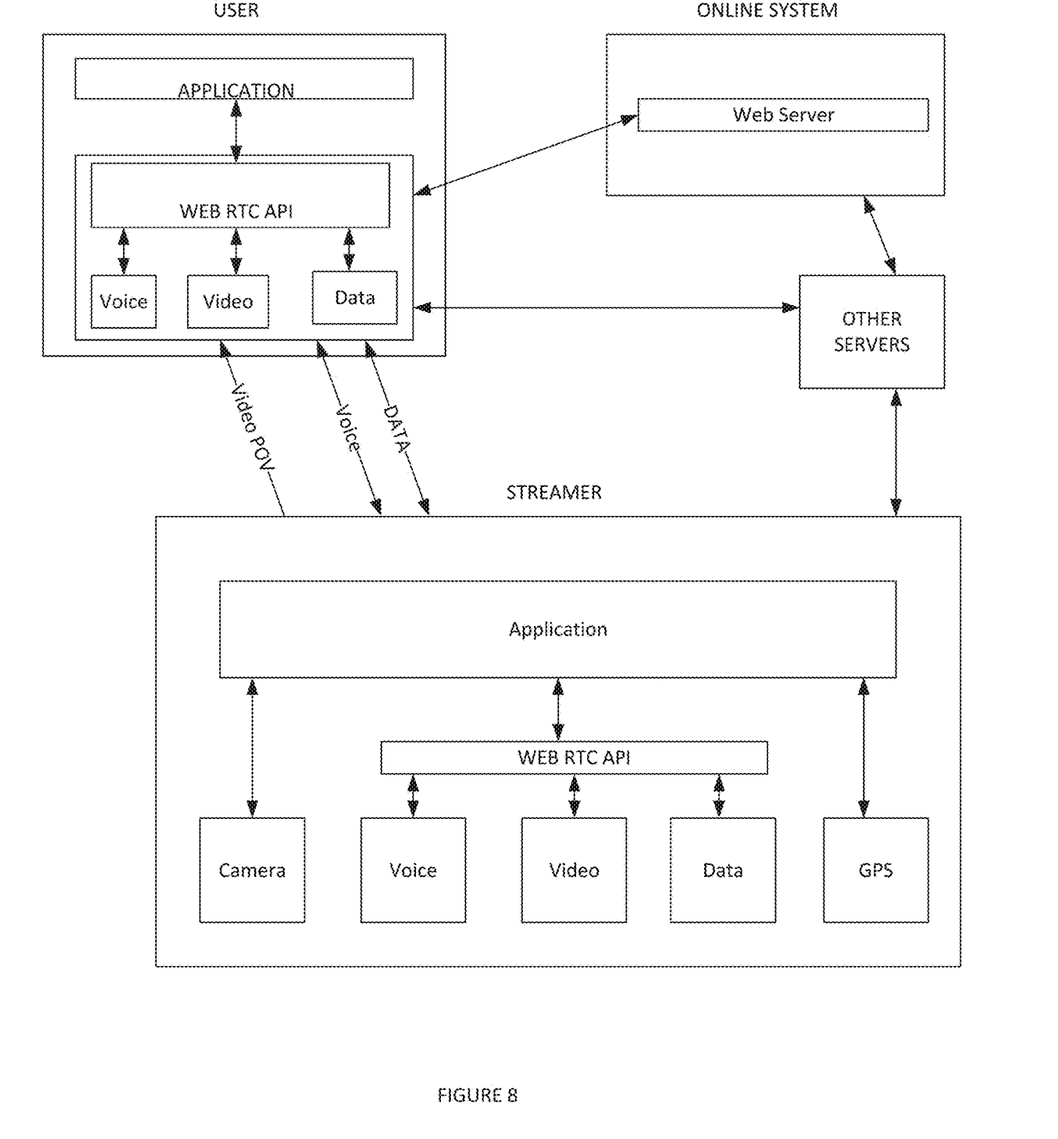
FIG. 8 depicts an embodiment of a viewer-to-streamer communication, and live POV stream delivery diagram based on a WebRTC application program interface (API).

FIG. 8 depicts an embodiment of a viewer-to-streamer communication, and live POV stream delivery diagram based on a WebRTC application program interface (API). Viewer computing device 120 shows software components running on the viewer's computing device, and streamer computing device 115 shows selected software components running on the streamer's computing device. In this example, an application program may perform a user agent function that monitors user activity and communications with online servers, such as web servers, logic server, etc.

The streamer computer device 115 may run on a web browser, stand-along application, etc., and may include a setup module that is configured to allow the streamer to enter his information, such as username, password, etc. A communication module may enable communications with the logic server between the streamer's applications including requests and responses to queries using data protocols, such as HTTP and WebSocket.

In a typical application, the streamer's application program may receive a notification from a session management system that a user has requested that he stream live from a specific landmark, along with information about the user, landmark, and session ID. The streamer at this point can interact with the user via discuss the streaming request. Should the streamer agree to provide the live POV stream request, the streamer may interact with a user interface to perform actions to accept the Live POV streaming request (i.e. by pressing a button). The streamer may also decline the request. At this point, streamers who have accepted a request may go the landmark, and press a button to initiate a communication session with the user, which may include two-way voice connection and/or a one way video stream.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

The invention claimed is:

1. A method for connecting a first viewer and a first point-of-view (POV) video streamer, comprising:
    transmitting a POV session request associated with a first computing device, the first computing device being associated with the first viewer, the POV session request including information associated with the first viewer and a first landmark location;
    determining a first viewer score;
    determining a first location score;
    determining a first POV streamer score based on proximity of the first POV video streamer from the first landmark location;
    selecting a first match between the first viewer and the first POV streamer;
    enabling the first viewer to communicate with the first POV streamer responsive to selecting the first match.

2. The method of claim 1, further comprising:
    determining a second POV streamer score based on the proximity of the second POV video streamer from the first landmark location;

selecting the first match between the first viewer and the first POV streamer responsive to determining that the first POV streamer score is greater than the second POV streamer score.

3. The method of claim 2, further comprising:
enabling a second match between the first viewer and the second POV streamer;
enabling the first viewer to communicate with the second POV streamer responsive to selecting the second match.

4. The method of claim 2, further comprising:
determining the first POV streamer score is above a score threshold; and
determining the second POV streamer score is below a score threshold.

5. The method of claim 1, wherein the match is based on the first viewer score, the first location score, and the first POV location score.

6. The method of claim 1, wherein the first viewer score is based on characteristics associated with the first viewer.

7. The method of claim 1, wherein the information associated with the first viewer includes an income of the first viewer, a connection data rate of the first viewer, and interest level of the first viewer associated with the first location.

8. The method of claim 1, wherein the selecting first match between the first viewer and the first POV streamer is based on determining the first POV streamer score is above a score threshold.

9. The method of claim 1, wherein the first POV streamer's score increases responsive to a distance between the first POV streamer and the first landmark location decreases.

10. The method of claim 1, wherein the first landmark location is associated with a website, wherein each unique page within the website includes corresponding landmark location information.

11. The method of claim 1, wherein the first landmark location is associated with a program application.

12. The method of claim 1, wherein the first video streamer is a real estate agent and first landmark location is a property for lease or sale.

13. A system for connecting a first viewer and a first point-of-view (POV) video streamer, the system comprising:
a client computing device configured to transmit a POV session request, the first computing device being associated with the first viewer, the POV session request including information associated with the first viewer and a first landmark location;
a server configured to determine a first viewer score, a first location score, a first POV streamer score based on a proximity of the first POV video streamer from the first landmark location;
a user interface configured to enable a selecting a first match between the first viewer and the first POV streamer;
a communication interface configured to enable the first viewer to communicate with the first POV streamer responsive to selecting the first match.

14. The system of claim 13, wherein the server is configured to determine a second POV streamer score based on the proximity of the second POV video streamer from the first landmark location, and select the first match between the first viewer and the first POV streamer responsive to determining that the first POV streamer score is greater than the second POV streamer score.

15. The system of claim 14, wherein the service is configured to enable a second match between the first viewer and the second POV streamer, and the communication interface is configured to enable the first viewer to communicate with the second POV streamer responsive to selecting the second match.

16. The system of claim 14, wherein the server is configured to determine the first POV streamer score is above a score threshold, and determine the second POV streamer score is below a score threshold.

17. The system of claim 13, wherein the match is based on the first viewer score, the first location score, and the first POV location score.

18. The system of claim 13, wherein the first viewer score is based on characteristics associated with the first viewer.

19. The system of claim 13, wherein the information associated with the first viewer includes an income of the first viewer, a connection data rate of the first viewer, and interest level of the first viewer associated with the first location.

20. The system of claim 13, wherein the selecting first match between the first viewer and the first POV streamer is based on determining the first POV streamer score is above a score threshold.

21. The system of claim 13, wherein the first POV streamer's score increases responsive to a distance between the first POV streamer and the first landmark location decreases.

22. The system of claim 13, wherein the first landmark location is associated with a website, wherein each unique page within the website includes corresponding landmark location information.

23. The system of claim 13, wherein the first landmark location is associated with a program application.

24. The system of claim 13, wherein the first video streamer is a real estate agent and first landmark location is a property for lease or sale.

* * * * *